US009841534B2

(12) United States Patent
Tapio et al.

(10) Patent No.: US 9,841,534 B2
(45) Date of Patent: Dec. 12, 2017

(54) METHODS FOR PREPARING OPTICALLY CLEAR ADHESIVES AND COATINGS

(75) Inventors: Scott M. Tapio, Falcon Heights, MN (US); Audrey A. Sherman, St. Paul, MN (US); William R. Dudley, Geneseo, NY (US); Joan M. Noyola, Maplewood, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 315 days.

(21) Appl. No.: 13/991,436

(22) PCT Filed: Dec. 13, 2011

(86) PCT No.: PCT/US2011/064570
§ 371 (c)(1),
(2), (4) Date: Aug. 19, 2013

(87) PCT Pub. No.: WO2012/082706
PCT Pub. Date: Jun. 21, 2012

(65) Prior Publication Data
US 2013/0337260 A1 Dec. 19, 2013

Related U.S. Application Data

(60) Provisional application No. 61/423,661, filed on Dec. 16, 2010.

(51) Int. Cl.
*G02B 1/10* (2015.01)
*C09D 4/00* (2006.01)
*C09J 4/00* (2006.01)
C08F 220/18 (2006.01)
C09J 133/06 (2006.01)
C08F 222/10 (2006.01)

(52) U.S. Cl.
CPC .............. *G02B 1/10* (2013.01); *C09D 4/00* (2013.01); *C09J 4/00* (2013.01); *C08F 220/18* (2013.01); *C08F 2222/1086* (2013.01); *C09J 133/06* (2013.01); *Y10T 428/2891* (2015.01)

(58) Field of Classification Search
CPC ....................................................... G02B 1/10
See application file for complete search history.

(56) References Cited

U.S. PATENT DOCUMENTS

| | | |
|---|---|---|
| RE24,906 E | 12/1960 | Ulrich |
| 3,250,808 A | 5/1966 | Moore |
| 3,544,537 A | 12/1970 | Brace |
| 3,553,179 A | 1/1971 | Bartlett |
| 4,228,232 A * | 10/1980 | Rousseau ................... 430/271.1 |
| 4,737,559 A | 4/1988 | Kellen |
| 4,980,440 A | 12/1990 | Kendziorski |
| 4,980,443 A | 12/1990 | Kendziorski |
| 5,223,465 A | 6/1993 | Ueki |
| 5,264,278 A * | 11/1993 | Mazurek ................... C09J 4/06 428/317.3 |
| RE34,605 E | 5/1994 | Schrenk |
| 5,356,719 A | 10/1994 | Hamada |
| 5,360,659 A | 11/1994 | Arends |
| 5,407,971 A | 4/1995 | Everaerts |
| 5,439,956 A * | 8/1995 | Noguchi ........................ 522/92 |
| 5,579,162 A | 11/1996 | Bjornard |
| 5,882,774 A | 3/1999 | Jonza |
| 5,906,788 A | 5/1999 | Boeckler |
| 6,049,419 A | 4/2000 | Wheatley |
| 6,103,316 A | 8/2000 | Tran |
| 6,207,727 B1 | 3/2001 | Beck |
| 6,339,111 B1 * | 1/2002 | Moon ....................... C08F 2/48 522/4 |
| 6,369,123 B1 | 4/2002 | Stark |
| 6,441,118 B2 | 8/2002 | Sherman |
| 7,767,728 B2 | 8/2010 | Lu |
| 8,765,217 B2 * | 7/2014 | McGuire, Jr. ......... C08F 120/18 427/207.1 |
| 2004/0077775 A1 | 4/2004 | Audenaert |
| 2004/0127594 A1 | 7/2004 | Yang |
| 2007/0092733 A1 | 4/2007 | Yang |
| 2009/0087629 A1 | 4/2009 | Everaerts |
| 2009/0262348 A1 | 10/2009 | Mazurek |
| 2010/0028694 A1 | 2/2010 | Zhang |
| 2010/0136265 A1 * | 6/2010 | Everaerts ............. C09J 133/066 428/1.31 |

FOREIGN PATENT DOCUMENTS

| | | |
|---|---|---|
| JP | 2007-284612 | 11/2007 |
| WO | WO 2009061673 A2 * | 5/2009 |
| WO | WO 2009-085662 | 7/2009 |
| WO | WO 2009085662 A2 * | 7/2009 |
| WO | WO 2010-132176 | 11/2010 |
| WO | WO 2011-050228 | 4/2011 |
| WO | WO 2011-050232 | 4/2011 |
| WO | WO 2011-050236 | 4/2011 |

OTHER PUBLICATIONS

Curing, BusinessDictionary.com, http://www.businessdictionary.com/definition/curing.html.*
International Search Report for PCT International Application No. PCT/US2011/064570, dated Aug. 29, 2012, 3 pages.

* cited by examiner

*Primary Examiner* — James M Mellott
(74) *Attorney, Agent, or Firm* — Jeffrey M. Olofson

(57) ABSTRACT

Optically clear adhesive or coating layers can be prepared by preparing a curable mixture, coating the curable mixture to form a layer, partially curing the curable mixture, drying the coated layer, and fully curing the curable mixture. The curable mixture may also be partially cured and then coated, dried and fully cured. The curable mixture includes two free radically polymerizable monomer compositions that are relatively incompatible and a transient compatibilizer, such as a solvent. Polymers of the two monomer compositions, if polymerized separately and blended, form phase separated domains. The curable mixture provides for adhesive or coating layers that are optically clear.

10 Claims, No Drawings

METHODS FOR PREPARING OPTICALLY CLEAR ADHESIVES AND COATINGS

FIELD OF THE DISCLOSURE

The present disclosure relates to adhesives and coatings, especially pressure sensitive adhesives, particularly pressure sensitive adhesives that are optically clear, and optical articles prepared from these adhesives and coatings.

BACKGROUND

A wide variety of articles utilize layers of cured polymeric materials. Some of these layers are adhesives. Adhesives have been used for a variety of marking, holding, protecting, sealing and masking purposes. Adhesive tapes generally comprise a backing, or substrate, and an adhesive. One type of adhesive, a pressure sensitive adhesive, is particularly preferred for many applications.

Pressure sensitive adhesives are well known to one of ordinary skill in the art to possess certain properties at room temperature including the following: (1) aggressive and permanent tack, (2) adherence with no more than finger pressure, (3) sufficient ability to hold onto an adherend, and (4) sufficient cohesive strength to be removed cleanly from the adherend. Materials that have been found to function well as pressure sensitive adhesives are polymers designed and formulated to exhibit the requisite viscoelastic properties resulting in a desired balance of tack, peel adhesion, and shear strength. The most commonly used polymers for preparation of pressure sensitive adhesives are natural rubber, synthetic rubbers (e.g., styrene/butadiene copolymers (SBR) and styrene/isoprene/styrene (SIS) block copolymers), various (meth)acrylate (e.g., acrylate and methacrylate) copolymers and silicones. Each of these classes of materials has advantages and disadvantages.

Other polymeric layers include for example coatings on substrates to provide desirable features to the surface of the substrate. Examples of such coatings include, for example, hardcoats. Hardcoats are curable materials applied to a substrate and cured to form a coating that can improve the durability of the surface and impart such properties as resistance to stains and scratches.

SUMMARY

The present disclosure comprises methods of preparing optical adhesive or coating layers, as well as articles that contain optical adhesive or coating layers. Among the embodiments are methods that comprise preparing a curable mixture, coating the curable mixture to form a layer, partially curing the curable mixture, drying the coated layer, and fully curing the curable mixture. The curable mixture comprises a first free radically polymerizable monomer composition, a second free radically polymerizable monomer composition, at least one free radical initiator, and a transient compatibilizer. The first monomer composition and the second monomer composition are selected such that blends of polymers formed from the first monomer composition and the second monomer composition form phase separated domains.

Also disclosed are methods of preparing optical adhesive or coating layers that comprise preparing a curable mixture, partially curing the curable mixture, coating the curable mixture to form a layer, drying the coated layer, and fully curing the curable mixture. The curable mixture comprises a first free radically polymerizable monomer composition, a second free radically polymerizable monomer composition, at least one free radical initiator, and a transient compatibilizer. The first monomer composition and the second monomer composition are selected such that blends of polymers formed from the first monomer composition and the second monomer composition form phase separated domains.

Also disclosed are optical articles. The optical articles comprise an optical substrate, and a layer of optically clear adhesive coated on the optical substrate. The optically clear adhesive comprises a cured reaction mixture comprising a first free radically polymerizable monomer composition, a second free radically polymerizable monomer composition, at least one free radical initiator, and a transient compatibilizer. The cured reaction mixture has a domain size smaller than the wavelength of visible light. The first monomer composition and the second monomer composition are selected such that blends of polymers formed from the first monomer composition and the second monomer composition form phase separated domains.

DETAILED DESCRIPTION

The use of layers of cured polymeric materials such as adhesives and coatings, especially pressure sensitive adhesives, in areas such as the medical, electronic and optical industries is increasing. The requirements of these industries require adhesives and coatings with specialized features. For example, adhesives, such as pressure sensitive adhesives, are needed that provide additional features beyond the traditional properties of tack, peel adhesion and shear strength. New classes of materials are desirable to meet the increasingly demanding performance requirements for adhesives and coatings.

In particular, the optical industry requires optical adhesives and coatings that are not only optically clear, but also provide a range of additional features. A variety of techniques can be used to prepare optically clear adhesives and coatings that also have additional features.

One technique is to utilize polymer blends. Blending together two or more different polymeric materials may produce a blended material that combines the desirable features of the components. In practice, however, blending of polymeric materials can lead to a material that has separated phases and therefore lacks optical clarity.

Another technique useful to generate optically clear adhesives and coatings with additional features involves the preparation of copolymers. Copolymers are polymeric materials that are formed from more than one type of monomer. However, just as polymeric blends can lead to separated phases and a lack of optical clarity, mixtures of monomers can also phase separate and generate copolymers which lack optical clarity.

In this disclosure, methods are described to prepare optically clear polymeric materials that are prepared from at least two different monomeric compositions. The monomeric compositions are relatively incompatible with one another. By relatively incompatible with one another, it is meant that both the homopolymers formed from the monomers and the monomers themselves, do not have an affinity for one another. The homopolymers being relatively incompatible means, that if the monomers were homopolymerized, the formed homopolymers, when blended, would form phase separated domains, and these phase separated domains are larger than the wavelength of visible light. Because these phase separated domains are larger than the wavelength of visible light, the blended materials do not have optical clarity. Additionally, the monomers themselves being relatively incompatible means that copolymerization of the at least two different monomeric compositions using traditional polymerization techniques, such as solvent polymerization and 100% solids polymerization, yields polymer materials with phase separated domains that are larger than the wavelength of visible light. Without wishing to be bound by theory, it is believed that mixtures of relatively incompatible monomers yields phase separated domains that are larger than the wavelength of visible light because the monomers segregate themselves to some extent and this segregation is locked into the formed polymer upon polymerization.

Some embodiments of the methods of this disclosure comprise the preparation of a curable reaction mixture comprising a first free radically polymerizable monomer composition, a second free radically polymerizable monomer composition, a free radical initiator, and a transient compatiblizer. The first and second free radically polymerizable monomer compositions are ones that, as described above, are relatively incompatible. The curable reaction mixture is coated to form a layer and partially cured. The partially cured layer can then be dried and fully cured to give a cured layer that is optically clear.

Other embodiments of the methods of this disclosure comprise the preparation of a curable reaction mixture comprising a first free radically polymerizable monomer composition, a second free radically polymerizable monomer composition, a free radical initiator, and a transient compatiblizer. The first and second free radically polymerizable monomer compositions are ones that, as described above, are relatively incompatible. The curable reaction mixture is partially cured and then coated to form a layer. The partially cured layer can then be dried and fully cured to give a cured layer that is optically clear.

These optically clear layers can be used to provide a variety of optical articles. These optical articles comprise an optical substrate, the cured optically clear layer, and may additionally comprise additional layers or substrates.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein. The recitation of numerical ranges by endpoints includes all numbers subsumed within that range (e.g. 1 to 5 includes 1, 1.5, 2, 2.75, 3, 3.80, 4, and 5) and any range within that range.

As used in this specification and the appended claims, the singular forms "a", "an", and "the" encompass embodiments having plural referents, unless the content clearly dictates otherwise. For example, reference to "a layer" encompasses embodiments having one, two or more layers. As used in this specification and the appended claims, the term "or" is generally employed in its sense including "and/or" unless the content clearly dictates otherwise.

The term "adhesive" as used herein refers to polymeric compositions useful to adhere together two adherends. Examples of adhesives are heat activated adhesives and pressure sensitive adhesives.

Heat activated adhesives are non-tacky at room temperature but become tacky and capable of bonding to a substrate at elevated temperatures. These adhesives usually have a $T_g$ (glass transition temperature) or melting point ($T_m$) above room temperature. When the temperature is elevated above the $T_g$ or $T_m$, the storage modulus usually decreases and the adhesive becomes tacky.

Pressure sensitive adhesive compositions are well known to those of ordinary skill in the art to possess properties including the following: (1) aggressive and permanent tack, (2) adherence with no more than finger pressure, (3) sufficient ability to hold onto an adherend, and (4) sufficient cohesive strength to be cleanly removable from the adherend. Materials that have been found to function well as pressure sensitive adhesives are polymers designed and formulated to exhibit the requisite viscoelastic properties resulting in a desired balance of tack, peel adhesion, and shear holding power. Obtaining the proper balance of properties is not a simple process.

The terms "free radically polymerizable" and "ethylenically unsaturated" are used interchangeably and refer to a reactive group which contains a carbon-carbon double bond which is able to be polymerized via a free radical polymerization mechanism.

Unless otherwise indicated, "optically transparent" refers to an article, film, adhesive, or coating that has a high light transmittance over at least a portion of the visible light spectrum (about 400 to about 700 nm). The term "transparent film" refers to a film having a thickness and when the film is disposed on a substrate, an image (disposed on or adjacent to the substrate) is visible through the thickness of the transparent film. In many embodiments, a transparent film allows the image to be seen through the thickness of the film without substantial loss of image clarity. In some embodiments, the transparent film has a matte or glossy finish.

Unless otherwise indicated, "optically clear" refers to an adhesive, coating, or article that has a high light transmittance over at least a portion of the visible light spectrum (about 400 to about 700 nm), and that exhibits low haze.

The term "(meth)acrylate" refers to monomeric acrylic or methacrylic esters of alcohols. Acrylate and methacrylate monomers or oligomers are referred to collectively herein as "(meth)acrylates".

As used herein, the term "polymer" refers to a polymeric material that is a homopolymer or a copolymer. As used herein, the term "homopolymer" refers to a polymeric material that is the reaction product of one monomer. As used herein, the term "copolymer" refers to a polymeric material that is the reaction product of at least two different monomers.

The term "phase separation" as used herein when referring to polymer blends or copolymers, refers to the presence of distinct domains (i.e., microdomains) in a matrix. In order for a matrix to be optically clear, the phase separated microdomains should be smaller than the wavelength of visible light (about 400 to about 700 nm).

The term "urea-based" as used herein refers to macromolecules that are segmented copolymers which contain at least one urea linkage.

The term "urethane-based" as used herein refers to macromolecules that are copolymers or segmented copolymers which contain at least one urethane linkage. The urethane group has the general structure (—O—(CO)—NR—) where (CO) defines a carbonyl group C=O, and R is hydrogen or an alkyl group.

The term "siloxane-based" or "silicone-based" as used herein refers to repeat units, to segmented copolymers or units of segmented copolymers that contain silicone units. The terms silicone or siloxane are used interchangeably and refer to units with dialkyl or diaryl siloxane (—SiR$_2$O—)

repeating units. Similarly, the term "non-silicone" refers to repeat units, to segmented copolymers or units of segmented copolymers that are free of silicone units.

The term "segmented copolymer" refers to a copolymer of linked segments, where each segment constitutes primarily a single structural unit or type of repeating unit. For example, a polyoxyalkylene segmented copolymer may have the following structure:

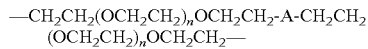
—CH$_2$CH$_2$(OCH$_2$CH$_2$)$_n$OCH$_2$CH$_2$-A-CH$_2$CH$_2$(OCH$_2$CH$_2$)$_n$OCH$_2$CH$_2$— where A is the linkage between the two polyoxyalkylene segments.

The term "reactive oligomer" as used herein refers to a macromolecule which contains terminal free radically polymerizable groups and at least 2 segments which are linked. "Urea-based reactive oligomers" are macromolecules which contain terminal free radical polymerizable groups and at least 2 segments which are linked by urea linkages.

The term "alkyl" refers to a monovalent group that is a radical of an alkane, which is a saturated hydrocarbon. The alkyl can be linear, branched, cyclic, or combinations thereof and typically has 1 to 20 carbon atoms. In some embodiments, the alkyl group contains 1 to 18, 1 to 12, 1 to 10, 1 to 8, 1 to 6, or 1 to 4 carbon atoms. Examples of alkyl groups include, but are not limited to, methyl, ethyl, n-propyl, isopropyl, n-butyl, isobutyl, tert-butyl, n-pentyl, n-hexyl, cyclohexyl, n-heptyl, n-octyl, and ethylhexyl.

The term "aryl" refers to a monovalent group that is carbocyclic and aromatic. The aryl can have one to five rings that are connected to or fused to the aromatic ring. The other ring structures can be aromatic, non-aromatic, or combinations thereof. Examples of aryl groups include, but are not limited to, phenyl, biphenyl, terphenyl, anthryl, naphthyl, acenaphthyl, anthraquinonyl, phenanthryl, anthracenyl, pyrenyl, perylenyl, and fluorenyl.

The term "alkylene" refers to a divalent group that is a radical of an alkane. The alkylene can be straight-chained, branched, cyclic, or combinations thereof. The alkylene often has 1 to 20 carbon atoms. In some embodiments, the alkylene contains 1 to 18, 1 to 12, 1 to 10, 1 to 8, 1 to 6, or 1 to 4 carbon atoms. The radical centers of the alkylene can be on the same carbon atom (i.e., an alkylidene) or on different carbon atoms.

The term "heteroalkylene" refers to a divalent group that includes at least two alkylene groups connected by a thio, oxy, or —NR— where R is alkyl. The heteroalkylene can be linear, branched, cyclic, substituted with alkyl groups, or combinations thereof. Some heteroalkylenes are poloxyyalkylenes where the heteroatom is oxygen such as for example:

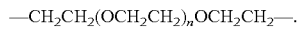
—CH$_2$CH$_2$(OCH$_2$CH$_2$)$_n$OCH$_2$CH$_2$—.

The term "arylene" refers to a divalent group that is carbocyclic and aromatic. The group has one to five rings that are connected, fused, or combinations thereof. The other rings can be aromatic, non-aromatic, or combinations thereof. In some embodiments, the arylene group has up to 5 rings, up to 4 rings, up to 3 rings, up to 2 rings, or one aromatic ring. For example, the arylene group can be phenylene.

The term "heteroarylene" refers to a divalent group that is carbocyclic and aromatic and contains heteroatoms such as sulfur, oxygen, nitrogen or halogens such as fluorine, chlorine, bromine or iodine.

The term "aralkylene" refers to a divalent group of formula —R$^a$—Ar$^a$— where R$^a$ is an alkylene and Ar$^a$ is an arylene (i.e., an alkylene is bonded to an arylene).

The term "fluorinated" when used in conjunction with an alkyl, alkylene or polyether group refers to having at least one hydrogen atom replaced with a fluorine atom. The term "fluorochemical-containing" refers to groups that contain at least one fluorinated unit. The term "highly fluorinated" refers to groups where nearly all of the hydrogen atoms have been replaced with fluorine atoms. The term "perfluorinated" refers to where all of the hydrogen atoms are replaced by fluorine atoms. For example, the term "fluorinated polyether" refers to an oxyalkylene having at least one hydrogen atom replaced with a fluorine atom. Where nearly all of the hydrogen atoms are replaced with fluorine atoms the group is referred to as "highly fluorinated polyether". Where all of the hydrogen atoms are replaced with fluorine atoms the group is referred to as "perfluoro polyether".

The term "HFPO—" refers to the end group F(CF(CF$_3$)CF$_2$O)$_u$CF(CF$_3$)— of the methyl ester F(CF(CF$_3$)CF$_2$O)$_u$CF(CF$_3$)C(O)OCH$_3$, wherein "u" averages from 1 to 50, which can be prepared from the oligomerization of hexafluoropropene oxide, according to the method disclosed in U.S. Pat. No. 3,250,808 (Moore et al.), with purification by fractional distillation, wherein the recitation of numerical ranges by endpoints includes all numbers subsumed within the range (e.g., the range 1 to 50 includes 1, 1.5, 3.33, and 50).

The methods of the present disclosure comprise the preparation of a curable reaction mixture. The curable reaction mixture comprises at least two different monomer compositions, and the at least two different monomer compositions are relatively incompatible with one another. The curable reaction mixture also comprises a free radical initiator and a transient compatibilizer. Additionally, the curable reaction mixture may also contain other reactive and nonreactive additives as long as they do not interfere with the formation of the desired optically clear matrix upon polymerization. The nature of the matrix formed upon curing of the curable mixture, whether it is an adhesive or a coating, will depend upon the nature of the two different monomer compositions, as well as other factors, such as, for example, the presence or absence of additives such as tackifiers, plasticizers and the like.

Typically the first monomer composition and the second monomer are dissolved in the transient compatibilizer, and the two monomer compositions combined are present at a percent solids of less than about 50% by weight. While not wishing to be bound by theory, it is believed that having a relatively dilute mixture of monomer compositions may aid in maintaining compatibility of the relatively incompatible monomer compositions. In some embodiments, the two monomer compositions combined are present at a percent solids of less than about 40% by weight, 35% by weight, 30% by weight, 25% by weight, 20% by weight, or even 15% by weight.

A wide variety of materials are suitable for use in the first monomer composition. The first monomer composition may be a single monomer or it may comprise a mixture of monomers. The first monomer composition is free radically polymerizable, meaning that the monomeric material comprises at least one free radically polymerizable group. (Meth)acrylate groups are particularly suitable free radically polymerizable groups. Examples of materials with (meth)acrylate groups suitable for use as the first monomer composition include: alkyl (meth)acrylate monomers; multifunctional (meth)acrylte monomers; and oligomeric (meth)acrylates.

In some embodiments, the first monomer composition comprises at least one alkyl (meth)acrylate monomer. Examples of alkyl (meth)acrylate monomers are those in which the alkyl groups comprise 1-12 carbon atoms and include, but are not limited to, methyl (meth)acrylate, n-butyl (meth)acrylate, 2-ethylhexyl (meth)acrylate, isooctyl (meth)acrylate, isononyl (meth)acrylate, isodecyl (meth) acrylate, isobornyl (meth)acrylate, and may be utilized in conjunction with one or more copolymerizable basic or acidic monomers.

Exemplary basic monomers include (meth)acrylate and vinyl functional monomers, such as N,N-dimethylaminopropyl methacrylamide (DMAPMAm); N,N-diethylaminopropyl methacrylamide (DEAPMAm); N,N-dimethylaminoethyl acrylate (DMAEA); N,N-diethylaminoethyl acrylate (DEAEA); N,N-dimethylaminopropyl acrylate (DMAPA); N,N-diethylaminopropyl acrylate (DEAPA); N,N-dimethylaminoethyl methacrylate (DMAEMA); N,N-diethylaminoethyl methacrylate (DEAEMA); N,N-dimethylaminoethyl acrylamide (DMAEAm); N,N-dimethylaminoethyl methacrylamide (DMAEMAm); N,N-diethylaminoethyl acrylamide (DEAEAm); N,N-diethylaminoethyl methacrylamide (DEAEMAm); N,N-dimethylaminoethyl vinyl ether (DMAEVE); N,N-diethylaminoethyl vinyl ether (DEAEVE); and mixtures thereof. Other useful basic monomers include vinylpyridine, vinylimidazole, tertiary amino-functionalized styrene (e.g., 4-(N,N-dimethylamino)-styrene (DMAS), 4-(N,N-diethylamino)-styrene (DEAS)), N-vinylpyrrolidone, N-vinylcaprolactam, acrylonitrile, N-vinylformamide, (meth)acrylamide, and mixtures thereof.

Useful acidic monomers include, but are not limited to, those selected from ethylenically unsaturated carboxylic acids, ethylenically unsaturated sulfonic acids, ethylenically unsaturated phosphonic acids, and mixtures thereof. Examples of such compounds include those selected from acrylic acid, methacrylic acid, itaconic acid, fumaric acid, crotonic acid, citraconic acid, maleic acid, oleic acid, beta-carboxyethyl acrylate, 2-sulfoethyl methacrylate, styrenesulfonic acid, 2-acrylamido-2-methylpropanesulfonic acid, vinylphosphonic acid, and the like, and mixtures thereof. Due to their availability, typically ethylenically unsaturated carboxylic acids are used.

In some embodiments, the first monomer composition comprises at least one multifunctional (meth)acrylate or other crosslinking agent. Multifunctional (meth)acrylates include, for example, di(meth)acrylates, tri(meth)acrylates, tetra(meth)acrylates, penta(meth)acrylates (that is, compounds comprising two, three, four, or five (meth)acrylate groups), or even (meth)acrylates with more than five (meth) acrylalte groups. Useful di(meth)acrylates include, for example, ethylene glycol di(meth)acrylate, diethylene glycol di(meth)acrylate, triethylene glycol di(meth)acrylate, tetraethylene glycol di(meth)acrylate, 1,4-butanediol di(meth)acrylate, 1,6-hexanediol di(meth)acrylate, alkoxylated 1,6-hexanediol diacrylates, tripropylene glycol diacrylate, dipropylene glycol diacrylate, cyclohexane dimethanol di(meth)acrylate, alkoxylated cyclohexane dimethanol diacrylates, ethoxylated bisphenol A di(meth)acrylates, neopentyl glycol diacrylate, polyethylene glycol di(meth)acrylates, polypropylene glycol di(meth)acrylates, and urethane di(meth)acrylates. Useful tri(meth)acrylates include, for example, trimethylolpropane tri(meth)acrylate, propoxylated trimethylolpropane triacrylates, ethoxylated trimethylolpropane triacrylates, tris(2-hydroxy ethyl)isocyanurate triacrylate, and pentaerythritol triacrylate. Examples of higher functional (meth)acrylates include, for example, ethoxylated pentaerithritol tetraacrylate and dipentaerithritol pentaacrylate.

In some embodiments, the first monomer composition comprises at least one oligomeric free radically polymerizable monomer, typically an oligomeric (meth)acrylate. The oligomeric free radically polymerizable monomer is of the general formula X—B—X, wherein X comprises an ethylenically unsaturated group, and B comprises a non-siloxane segmented urea-based, a non-siloxane segmented urethane-based unit, a siloxane-based unit, or a fluorocarbon-containing unit. In some embodiments, the oligomeric free radically polymerizable monomer is monofunctional, of the general formula G-X, wherein X comprises an ethylenically unsaturated group, and G comprises a fluorocarbon-containing unit.

In some embodiments, the disclosure includes a curable composition containing at least one X—B—X reactive oligomer, in which X comprises an ethylenically unsaturated group, and B comprises a non-siloxane segmented urea-based unit. Examples of suitable X—B—X reactive oligomers are described, for example, in PCT Publication WO 2009/085662. The urea-based unit may contain polyoxyalkylene groups.

Non-siloxane urea-based polyamines are used to prepare the non-siloxane urea-based X—B—X reactive oligomers. The preparation of non-siloxane urea-based polyamines may be achieved through the reaction of polyamines with carbonates. A wide variety of different types of polyamines may be used. In some embodiments the polyamines are polyoxyalkylene polyamines. Such polyamines are also sometimes referred to as polyether polyamines.

The polyoxyalkylene polyamine may be, for example, a polyoxyethylene polyamine, polyoxypropylene polyamine, polyoxytetramethylene polyamine, or mixtures thereof. Polyoxyethylene polyamine may be especially useful when preparing the adhesive for medical applications, for example, where high vapor transfer media may be desirable.

Many polyoxyalkylene polyamines are commercially available. For example, polyoxyalkylene diamines are available under trade designations such as D-230, D-400, D-2000, D-4000, DU-700, ED-2001 and EDR-148 (available from Huntsman Chemical; Houston, Tex. under the family trade designation JEFFAMINE). Polyoxyalkylene triamines are available under trade designations such as T-3000 and T-5000 (available from Huntsman Chemical; Houston, Tex.).

A variety of different carbonates may be reacted with the polyamine to give the non-siloxane urea-based polyamine. Suitable carbonates include alkyl, aryl and mixed alkyl-aryl carbonates. Examples include carbonates such as ethylene carbonate, 1,2- or 1,3-propylene carbonate, diphenyl carbonate, ditolyl carbonate, dinaphthyl carbonate, ethyl phenyl carbonate, dibenzyl carbonate, dimethyl carbonate, diethyl carbonate, dipropyl carbonate, dibutyl carbonate, dihexyl carbonate, and the like. In some embodiments the carbonate is a diaryl carbonate, such as for example, diphenyl carbonate.

In some embodiments, the disclosure includes a curable reaction mixture containing at least one X—B—X reactive oligomer, in which X comprises an ethylenically unsaturated group, and B comprises a non-siloxane segmented urethane-based unit. Examples of suitable X—B—X reactive oligomers are described, for example, in PCT Publication WO 2010/132176.

Typically, urethane-based reactive oligomers comprise urethane-based units where the units —B— comprise units of the general structure -A-D-A-, where the D unit is a non-siloxane group and the A groups are urethane linkages. Therefore, the typical non-siloxane urethane-based reactive oligomers of this disclosure have the general structure X-A-D-A-X.

The X-A-D-A-X reactive oligomers may be prepared, for example, by the reaction of a hydroxyl-functional precursor of general formula HO-D-OH with 2 equivalents of an isocyanate-functional precursor of the general formula Z—X, where the Z group is isocyanate-functional and the X groups are ethylenically unsaturated groups. The isocyanate functionality of the Z group reacts with a hydroxyl group of the polyol to form the urethane linkage.

A wide variety of HO-D-OH precursors may be used. The HO-D-OH may be polyol or it may be a hydroxyl-capped prepolymer such as a polyurethane, polyester, polyamide, or polyurea prepolymer.

Examples of useful polyols include, but are not limited to, polyester polyols (e.g., lactone polyols) and the alkylene oxide (e.g., ethylene oxide; 1,2-epoxypropane; 1,2-epoxybutane; 2,3-epoxybutane; isobutylene oxide; and epichlorohydrin) adducts thereof, polyether polyols (e.g., polyoxyalkylene polyols, such as polypropylene oxide polyols, polyethylene oxide polyols, polypropylene oxide polyethylene oxide copolymer polyols, and polyoxytetramethylene polyols; polyoxycycloalkylene polyols; polythioethers; and alkylene oxide adducts thereof), polyalkylene polyols, mixtures thereof, and copolymers therefrom. Polyoxyalkylene polyols are particularly useful.

When copolymers are used, chemically similar repeating units may be randomly distributed throughout the copolymer or in the form of blocks in the copolymer. Similarly, chemically similar repeating units may be arranged in any suitable order within the copolymer. For example, oxyalkylene repeating units may be internal or terminal units within a copolymer. The oxyalkylene repeating units may be randomly distributed or in the form of blocks within a copolymer. One example of a copolymer containing oxyalkylene repeating units is a polyoxyalkylene-capped polyoxyalkylene polyol (e.g., a polyoxyethylene-capped polyoxypropylene).

Where HO-D-OH is a hydroxyl-capped prepolymer, a wide variety of precursor molecules can be used to produce the desired HO-D-OH prepolymer. For example, the reaction of polyols with less than stoichiometric amounts of diisocyanates can produce a hydroxyl-capped polyurethane prepolymer. Examples of suitable diisocyanates include, but are not limited to, aromatic diisocyanates, such as 2,6-toluene diisocyanate, 2,5-toluene diisocyanate, 2,4-toluene diisocyanate, m-phenylene diisocyanate, p-phenylene diisocyanate, methylene bis(o-chlorophenyl diisocyanate), methylenediphenylene-4,4'-diisocyanate, polycarbodiimide-modified methylenediphenylene diisocyanate, (4,4'-diisocyanato-3,3',5,5'-tetraethyl) biphenylmethane, 4,4'-diisocyanato-3,3'-dimethoxybiphenyl, 5-chloro-2,4-toluene diisocyanate, 1-chloromethyl-2,4-diisocyanato benzene, aromatic-aliphatic diisocyanates such as m-xylylene diisocyanate, tetramethyl-m-xylylene diisocyanate, aliphatic diisocyanates, such as 1,4-diisocyanatobutane, 1,6-diisocyanatohexane, 1,12-diisocyanatododecane, 2-methyl-1,5diisocyanatopentane, and cycloaliphatic diisocyanates such as methylene-dicyclohexylene-4,4'-diisocyanate, and 3-isocyanatomethyl-3,5,5-trimethyl-cyclohexyl isocyanate (isophorone diisocyanate).

A variety of X-A-D-A-X curable non-siloxane urethane-based reactive oligomers are commercially available. For example, a urethane acrylate oligomer of weight avarerge molecular weight in the range of 4,000-7,000 g/mole is commercially available from Nihon Gosei Kagaku under the trade name "UV-6100B". Also a variety of urethane oligomers are available from Sartomer Company, Exton, Pa. under the trade names "CN9018", "CN9002" and "CN9004".

A wide variety of reactive oligomers containing a siloxane-based unit are suitable for use in preparing the first adhesive layer. Exemplary classes of materials include siloxanes with at least two vinyl groups and siloxane (meth)acrylates.

Examples of useful siloxanes having at least two vinyl groups include vinyl terminated polydimethylsiloxanes having the formula $H_2C=CHSiMe_2O(SiMe_2O)_n SiMe_2CH=CH_2$ (CAS 68083-19-2); vinyl terminated dimethylsiloxane-diphenylsiloxane copolymers having the formula $H_2C=CHSiMe_2O(SiMe_2O)_n(SiPh_2O)_n SiMe_2CH=CH_2$ (CAS: 68951-96-2); vinyl terminated polyphenylmethylsiloxanes having the formula $H_2C=CHSiMePhO(SiMePhO)_nSiMePhCH=CH_2$ (CAS: 225927-21-9); vinyl-phenyl-methyl terminated vinylphenylsiloxane-methylphenylsiloxane copolymers (CAS: 8027-82-1); vinyl terminated trifluoropropylmethylsiloxane-dimethylsiloxane copolymers having the formula $H_2C=CHSiMePhO(SiMe_2O)_n(SiMeCH_2CH_2CF_3O)_m SiMePhCH=CH_2$ (CAS: 68951-98-4); vinyl terminated dimethylsiloxane-diethylsiloxane copolymers having the formula $H_2C=CHSiMe_2O(SiMe_2O)_n(SiEt_2O)_n SiMe_2CH=CH_2$; trimethylsiloxy terminated vinylmethylsiloxane-dimethylsiloxane copolymers $Me_3SiO(SiMe_2O)_n (SiMe(CH=CH_2)O)_mSiMe_3$ (CAS: 67762-94-1); vinyl terminated vinylmethylsiloxane-dimethylsiloxane copolymers having the formula $H_2C=CH(SiMe_2O)_n(SiMeCH=CH_2O)_mSiMe_2CH=CH_2$ (CAS: 68063-18-1); vinylmethylsiloxane homopolymers (cyclic and linear) having the formula $Me_3SiO(SiMe(CH=CH_2)O)_nSiMe_3$; and vinyl T-structure polymers having the formula $MeSi[O(SiMe_2O)_mSiMe_2CH=CH_2]_3$; all commercially available from vendors such as, for example, Gelest, Inc., Morrisville, Pa. or Dow Corning Corp., Midland, Mich.

In some embodiments, the siloxanes with at least two vinyl groups may be at least partially fluorinated (i.e., be a fluorosilicone). Details concerning preparation of fluorinated siloxanes having at least two vinyl groups may be found in, for example, U.S. Pat. No. 4,980,440 (Kendziorski et al.); U.S. Pat. No. 4,980,443 (Kendziorski et al.); and U.S. Pat. No. 5,356,719 (Hamada et al.). Commercially available fluorosilicones of these types include vinyl terminated (35-45% trifluoropropylmethylsiloxane)-dimethylsiloxane copolymer available from Gelest, Inc., and the vinyl-terminated fluorosilicone that is commercially available under the trade designation "SYL-OFF Q2-7785" from Dow Corning Corp., Midland, Mich.

Another useful class of reactive oligomers with siloxane-based units are siloxane (meth)acrylates. Siloxane (meth)acrylates may be prepared starting from siloxane diamines as described in U.S. Pat. No. 5,264,278 (Mazurek et al.), U.S. Pat. No. 6,441,118 (Sherman et al.) or US Patent Publication No. 2009/0262348 (Mazurek et al.). Other siloxane (meth)acrylates contain segmented siloxane-based copolymer units.

One suitable class of segmented siloxane-based (meth)acrylates are so called "silicone-polyether" block copolymer-based (meth)acrylates. These copolymers typically have at least one siloxane block (i.e. with dialkyl or diaryl siloxane ($—SiR_2O—$) repeating units), and at least one polyether or oxyalkylene block. Frequently the silicone-polyether block copolymer-based (meth)acrylates have at least two (meth)acrylate groups. Some silicone-polyether block copolymer-based (meth)acrylates have more than two (meth)acrylate groups.

The segmented siloxane-based (meth)acrylates may be linear having a general structure of the type:

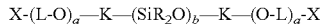

X-(L-O)$_a$—K—(SiR$_2$O)$_b$—K—(O-L)$_a$-X where X is a (meth)acrylate group (—O—(CO)—CR$_a$=CH$_2$) where (CO) represents a carbonyl group C=O, and R$_a$ is a hydrogen atom or a methyl group; L is an alkylene group and typically is an ethylene group (—CH$_2$—CH$_2$—); K is difunctional linking group, typically an alkylene group such as a propylene group (—CH$_2$—CH$_2$—CH$_2$—); R is alkyl or aryl group, typically a methyl group; and a and b are independently integers greater than 1.

Other segmented siloxane-based (meth)acrylates have pendent structures of the general type:

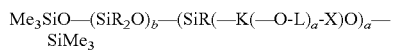

Me$_3$SiO—(SiR$_2$O)$_b$—(SiR(—K(—O-L)$_a$-X)O)$_a$—SiMe$_3$ where Me is a methyl group; X is a (meth)acrylate group (—O—(CO)—CR$_a$=CH$_2$) where (CO) represents a carbonyl group C=O, and R$_a$ is a hydrogen atom or a methyl group; L is an alkylene group and typically is an ethylene group (—CH$_2$—CH$_2$—); K is difunctional linking group, typically an alkylene group such as a propylene group (—CH$_2$—CH$_2$—CH$_2$—); R is an alkyl or aryl group, typically a methyl group; and a and b are independently integers greater than 1.

Examples of commercially available segmented siloxane-based (meth)acrylates include: those from Momentive Performance Materials, Columbus, Ohio, under the trade name "COAT-O-SIL" such as COAT-O-SIL 3503 and COAT-O-SIL 3509; those from Cytec Industries, Inc., Woodland Park, N.J., under the trade name "EBECRYL" such as EBECRYL 350 and EBECRYL 1360; and TEGORAD 2200N commercially available from Evonik Industries, AG, Essen, Germany.

Any suitable ethylenically unsaturated fluorinated oligomer may be used as the first monomeric composition of this disclosure. Particularly suitable are ethylenically unsaturated fluorinated polyether monomers. These monomers typically contain a terminal ethylenically unsaturated group and a fluorinated polyether group. Examples of suitable ethylenically unsaturated fluorinated polyether monomers can be represented by the formula: R$_f$-L$_1$-X, where R$_f$ is a fluorinated polyether group; L$_1$ is a divalent linking group; and X is an ethylnenically unsaturated group. Examples of ethylenically unsaturated groups include vinyl groups and (meth)acrylate groups. (Meth)acrylate fluorinated polyethers are particularly useful.

The fluorinated polyether group R$_f$ can be linear, branched, cyclic, or combinations thereof and can be saturated or unsaturated, it may partially fluorinated or fully fluorinated i.e a perfluoropolyether. The fluorinated polyether has at least four catenated oxygen heteroatoms. The fluorinated polyether groups can be described as containing repeating units and terminal units. Exemplary fluorinated polyether groups include those that have repeating units selected from the group of —(C$_p$J$_{2p}$)—, —(C$_p$J$_{2p}$O)—, —(CJ(Z))—, —(CJ(Z')O)—, —(CJ(Z')C$_p$J$_{2p}$O)—, —(C$_p$J$_{2p}$CJ(Z)O)—, —(CJ$_2$CJ(Z')O)—, or combinations thereof, where each J is independently either an H atom or an F atom, in the case of perfluoropolyethers, each J is an F atom. In these repeating units, p is typically an integer of 1 to 10. In some embodiments, p is an integer of 1 to 8, 1 to 6, 1 to 4, or 1 to 3. The group Z' is a an alkyl group, a fluorinated alkyl group, a perfluoroalkyl group, a perfluoroether group, a perfluoropolyether group, or a perfluoroalkoxy group, all of which can be linear, branched, or cyclic. The Z' group typically has no more than 12 carbon atoms, no more than 10 carbon atoms, or no more than 9 carbon atoms, no more than 4 carbon atoms, no more than 3 carbon atoms, no more than 2 carbon atoms, or no more than 1 carbon atom. In some embodiments, the Z' group can have no more than 4, no more than 3, no more than 2, no more than 1, or no oxygen atoms. In these fluorinated polyether structures, the different repeat units can be distributed randomly along the chain. The R$_f$ terminal groups can be (C$_p$J$_{2p+1}$)—, (C$_p$J$_{2p+1}$O)—, (J'C$_p$J$_{2p}$O)—, or (J'C$_p$J$_{2p}$)— where J is an H atom or an F atom, J' is hydrogen, chlorine, or bromine and p is an integer of 1 to 10. In some embodiments, the terminal group is perfluorinated and p is an integer of 1 to 10, 1 to 8, 1 to 6, 1 to 4, or 1 to 3. Exemplary R$_f$ groups include, for example, CF$_3$O(C$_2$F$_4$O)$_n$CF$_2$—, C$_3$F$_7$O(CF$_2$CF$_2$CF$_2$O)$_a$CF$_2$CF$_2$—, and C$_3$F$_7$O(CF(CF$_3$)CF$_2$O)$_a$CF(CF$_3$)— wherein "a" has an average value of 0 to 50, 1 to 50, 3 to 30, 3 to 15, or 3 to 10.

The linking group L$_1$ between the perfluoropolyether segment and ethylenically unsaturated endgroup includes a divalent or higher valency group selected from an alkylene, arylene, heteroalkylene, or combinations thereof and an optional divalent group selected from carbonyl, ester, amide, sulfonamide, or combinations thereof. L$_1$ can be unsubstituted or substituted with an alkyl, aryl, halo, or combinations thereof. The L$_1$ group typically has no more than 30 carbon atoms. In some compounds, the L$_1$ group has no more than 20 carbon atoms, no more than 10 carbon atoms, no more than 6 carbon atoms, or no more than 4 carbon atoms. For example, L$_1$ can be an alkylene, an alkylene substituted with an aryl group, or an alkylene in combination with an arylene or an alkyl ether or alkyl thioether linking group.

Perfluoropolyether acrylate compounds can be synthesized by known techniques such as described in U.S. Pat. Nos. 3,553,179 and 3,544,537 as well as U.S. Patent Application Publication No. 2004/0077775.

The fluorinated polyether (meth)acrylate compounds may be produced by introducing (meth)acrylate groups at the hydroxyl group of fluorinated polyether compounds having a terminal hydroxyl group. In some embodiments, the fluorinated polyether compounds with a terminal hydroxyl group may be a highly fluorinated. Suitable examples of such hydroxyl-group containing fluorinated polyether compounds includes for example: HOCH$_2$—CF$_2$O—(CF$_2$CF$_2$O)$_l$—(CF$_2$O)$_m$—CF$_2$CH$_2$OH; F—(CF$_2$CF$_2$CF$_2$O)$_l$—CF$_2$CF$_2$CH$_2$OH; F—(CF(CF$_3$)CF$_2$O)$_l$—CF(CF$_3$)CH$_2$OH; HOCH$_2$—CF(CF$_3$)O—(CF$_2$CF(CF$_3$)O)$_l$—O(CF$_2$)$_m$—O—(CF(CF$_3$)CF$_2$O)$_l$—OCF(CF$_3$)CH$_2$OH; HO(CH$_2$CH$_2$O)$_n$—CH$_2$—CF$_2$O—(CF$_2$CF$_2$O)$_1$—(CF$_2$O)$_m$—CF$_2$CH$_2$(OCH$_2$CH$_2$)$_n$OH; CF$_3$OCF$_2$CF$_2$CF$_2$OCHFCF$_2$C(O)NHCH$_2$CH$_2$OH; CF$_3$CF$_2$CF$_2$OCHFCF$_2$C(O)NHCH$_2$CH$_2$OH; CF$_3$CF$_2$CF$_2$OCHFCF$_2$CH$_2$OH; CF$_3$CFH—O—(CF$_2$)$_5$CH$_2$OH; CF$_3$—O—CF$_2$—O—CF$_2$—CF$_2$—O—CF$_2$—CHF—CF$_2$CH$_2$OH; CF$_3$—(O—CF$_2$)$_2$—O—CF$_2$—CF$_2$—O—CHF—CF$_2$—CH$_2$OH; and HOCH$_2$CH(OH)CH$_2$O—CH$_2$—CF$_2$O—(CF$_2$CF$_2$O)$_l$—CF$_2$O)$_m$—CF$_2$CH$_2$OCH$_2$CH(OH)CH$_2$OH where each l, m and n is an integer of at least 1.

In some embodiments, the perfluoropolyether group comprises an "HFPO—" end group, i.e. the end group F(CF(CF$_3$)CF$_2$O)$_u$CF(CF$_3$)— (of the methyl ester F(CF(CF$_3$)CF$_2$O)$_u$CF(CF$_3$)C(O)OCH$_3$) wherein u averages 2 to 50 or even 4 to 50. In some embodiments, u averages at least 3 or 4. Typically, u is no greater than 8 or 10. Such compounds generally exist as a distribution or mixture of oligomers with a range of values for u, so that the average value of u may be non-integer. In one embodiment, u averages about 7. A particularly useful fluorinated methacrylate monomer has the structure:

$$F(CF(CF_3)CF_2O)_u CF(CF_3)-C(O)N(H)CH_2CH_2OC(O)CMe=CH_2 \quad \text{Formula I}$$

where u averages about 6.84, with an average molecular weight of 1,344 g/mol and C(O) represents a carbonyl group (C=O).

The second monomer composition is relatively incompatible with the first monomer composition. The second monomer composition comprises at least one oligomeric free radically polymerizable monomer, typically an oligomeric (meth)acrylate. The oligomeric free radically polymerizable monomer is of the general formula X—B—X or G-X wherein X comprises an ethylenically unsaturated group, and B comprises a non-siloxane segmented urea-based, a non-siloxane segmented urethane-based unit, a siloxane-based unit, or a fluorocarbon-containing unit, as described above, and G comprises a fluorinated group as described above. Since, the second monomer composition is relatively incompatible with the first monomer composition, if the first monomer composition is an oligomeric free radically polymerizable monomer, it is chosen from a different group of oligomeric monomers than the first monomer composition.

Typically, the curable composition also comprises at least one initiator to initiate free radical polymerization. In some embodiments, it may be desirable to have two initiators, one initiator that is activated to initiate partial polymerization and a second initiator to effect complete polymerization. The initiator may be either a thermal initiator or a photoinitiator. Suitable thermal free radical initiators which may be utilized include, but are not limited to, those selected from azo compounds, such as 2,2'-azobis(isobutyronitrile); hydroperoxides, such as tert-butyl hydroperoxide; and, peroxides, such as benzoyl peroxide and cyclohexanone peroxide. Photoinitiators which are useful include, but are not limited to, those selected from benzoin ethers, such as benzoin methyl ether or benzoin isopropyl ether; substituted benzoin ethers, such as anisole methyl ether; substituted acetophenones, such as 2,2-diethoxyacetophenone and 2,2-dimethoxy-2-phenyl acetophenone; substituted alpha-ketols, such as 2-methyl-2-hydroxy propiophenone; aromatic sulfonyl chlorides, such as 2-naphthalene sulfonyl chloride; and, photoactive oximes, such as 1-phenyl-1,2-propanedione-2-(ethoxycarbonyl)oxime or benzophenone derivatives. Benzophenone derivatives and methods for making them are well known in the art, and are described in, for example, U.S. Pat. No. 6,207,727 (Beck et al.). Exemplary benzophenone derivatives include symmetrical benzophenones (e.g., benzophenone, 4,4'-dimethoxybenzophenone, 4,4'-diphenoxybenzophenone, 4,4'-diphenylbenzophenone, 4,4'-dimethylbenzophenone, 4,4-dichlorobenzophenone); asymmetric benzophenones (e.g., chlorobenzophenone, ethylbenzophenone, benzoylbenzophenone, bromobenzophenone); and free-radically polymerizable benzophenones (e.g., acryloxyethoxybenzophenone). Benzophenone itself is inexpensive, and may be preferable if cost is a factor. Copolymerizable benzophenones may be useful if residual odor or volatiles are a concern, and may be preferable for those applications as they become covalently incorporated into the composition during cure. Examples of useful copolymerizable photoinitiators are disclosed, for example, in U.S. Pat. No. 6,369,123 (Stark et al.), U.S. Pat. No. 5,407,971 (Everaerts et al.), and U.S. Pat. No. 4,737,559 (Kellen et al.). The copolymerizable photocrosslinking agents either generate free radicals directly or abstract hydrogen abstraction atoms to generate free radicals. Examples of hydrogen abstraction type photocrosslinkers include, for example, those based on benzophenones, acetophenones, anthraquinones, and the like. Examples of suitable copolymerizable hydrogen abstraction crosslinking compounds include mono-ethylenically unsaturated aromatic ketone monomers free of orthoaromatic hydroxyl groups. Examples of suitable free-radical generating copolymerizable crosslinking agents include but are not limited to those selected from the group consisting of 4-acryloxybenzophenone (ABP), para-acryloxyethoxybenophenone, and para-N-(methacryloxyethyl)-carbamoylethoxybenophenone. For both thermal- and radiation-induced polymerizations, the initiator is present in an amount of about 0.05% to about 5.0% by weight based upon the total weight of the monomers.

The curable composition also includes a transient compatibilizer. The transient compatibilizer may comprise one or more solvents. A wide variety of solvents are suitable. Particularly suitable are solvents that do not interfere with the polymerization reaction when the curable composition is cured. Solvents can help reduce the viscosity of the curable composition, permitting it to be more easily coated, and can help in maintaining the fluidity of the composition during curing. Examples of suitable solvents include: alcohols such as methanol, ethanol, isopropanol and the like; aliphatic hydrocarbons such as hexanes, heptanes, petroleum ether and the like; aromatic solvents such as benzene, toluene, and the like; ethers such as diethyl ether, THF (tetrahydrofuran), and the like; esters such as ethyl acetate and the like; and ketones such as acetone, MEK (methyl ethyl ketone) and the like.

In addition to the reactants, optional property modifying additives can be mixed with the reactive oligomers and optional other monomers provided that they do not interfere with the polymerization reaction. Typical property modifiers include tackifying agents (tackifiers) and plasticizing agents (plasticizers) to modify the adhesive performance of the formed adhesive composition. If used, the tackifiers and plasticizers are generally present in amounts ranging from about 5% to about 55% by weight, about 10 to about 45% by weight or even from about 10% to about 35% by weight.

Useful tackifiers and plasticizers are those conventionally used in the adhesive arts. Examples of suitable tackifying resins include terpene phenolics, alpha methyl styrene resins, rosin derived tackifiers, monomeric alcohols, oligomeric alcohols, oligomeric glycols, and mixtures thereof. Examples of useful plasticizing resins include terpene phenolics, rosin derived plasticizers, polyglycols and mixtures thereof. In some embodiments the plasticizer is isopropyl myristate or a polypropylene glycol.

The formed polymer composition may also be blended with additional pressure sensitive adhesive polymers to modify the properties of the composition. In some embodiments an acidic pressure sensitive adhesive, such as an acidic (meth)acrylate pressure sensitive adhesive, is blended to form an acid-base interaction with electron rich groups on the cured copolymer in instances where electron rich groups are present, such as urethane and urea groups. This acid-base interaction between the polymers is a Lewis acid-base type interaction. Lewis acid-base type interactions require that one component be an electron acceptor (acid) and the other an electron donor (base). The electron donor provides an unshared pair of electrons and the electron acceptor furnishes an orbital system that can accommodate the additional unshared pair of electrons. In this instance acid groups, typically carboxylic acid groups, on the added (meth)acrylate pressure sensitive adhesive polymer interact with the unshared electron pairs of, for example, urea or urethane groups.

Examples of suitable (meth)acrylate pressure sensitive adhesives include (meth)acrylate copolymers prepared from alkyl (meth)acrylate monomers and may contain additional monomers such as vinyl monomers. Examples of such alkyl (meth)acrylate monomers are those in which the alkyl groups comprise from about 4 carbon atoms to about 12 carbon atoms and include, but are not limited to, n-butyl acrylate, 2-ethylhexyl acrylate, isooctyl acrylate, isononyl acrylate, isodecyl, acrylate, and mixtures thereof. Optionally, other vinyl monomers and alkyl (meth)acrylate monomers which, as homopolymers, have a $T_g$ greater than 0° C., such as methyl acrylate, methyl methacrylate, isobornyl acrylate, vinyl acetate, styrene, and the like, may be utilized in conjunction with one or more of the low $T_g$ alkyl (meth) acrylate monomers and copolymerizable acidic monomers, provided that the $T_g$ of the resultant (meth)acrylate copolymer is less than about 0° C.

When the (meth)acrylate pressure sensitive adhesive is an acidic copolymer, the acidic (meth)acrylate copolymers typically are derived from acidic monomers comprising about 2% by weight to about 30% by weight, or about 2% by weight to about 15% by weight, of a copolymerizable acidic monomer. Examples of useful acidic monomers include (meth)acrylic acid, itaconic acid, crotonic acid, maleic acid, fumaric acid, and the like.

When used, the added pressure sensitive adhesive may be used in any suitable amount to achieve the desired properties of the composition. For example, the added pressure sensitive adhesive may be added in amounts of from about 5 to about 60 weight % of the composition.

In addition, other property modifiers, such as fillers, may be added if desired, provided that if and when incorporated, such additives are not detrimental to the properties desired in the final composition. Fillers, such as fumed silica, fibers (e.g., glass, metal, inorganic, or organic fibers), carbon black, glass or ceramic beads/bubbles, particles (e.g., metal, inorganic, or organic particles), polyaramids (e.g., those available from DuPont Chemical Company; Wilmington, Del. under the trade designation, KEVLAR), and the like which can be added in amounts up to about 30% by weight. Other additives such as dyes, inert fluids (e.g., hydrocarbon oils), pigments, flame retardants, stabilizers, antioxidants, compatibilizers, antimicrobial agents (e.g., zinc oxide), electrical conductors, thermal conductors (e.g., aluminum oxide, boron nitride, aluminum nitride, and nickel particles), and the like can be blended into these systems in amounts of generally from about 1 to about 50 percent by total volume of the composition.

A variety of different methods may be used to form optically clear adhesive and coating layers from the above described curable mixture. In one method, the curable mixture is coated onto a substrate, partially cured, dried to remove the transient compatibilizer, and fully cured. In another method of this disclosure, the curable mixture is partially cured, coated onto a substrate, dried to remove the transient compatibilizer, and fully cured. Each of these methods are described below.

In some embodiments, the curable mixture is coated onto a substrate, partially cured, dried to remove the transient compatibilizer, and fully cured. A wide variety of coating techniques may be used to coat the curable mixture onto a substrate. Suitable techniques include, for example, knife coating, roll coating, gravure coating, rod coating, curtain coating, slot coating, air knife coating, or print techniques such as inkjet printing or screen printing. The coatings can be of any desired thickness, depending upon the concentration of the curable mixture and the desired final thickness of the coating or adhesive.

The substrate may comprise rigid substrate or a carrier web that typically is flexible, depending upon the type of adhesive article that is desired. Examples of such carrier webs include papers and polymeric films. Examples of papers include clay-coated paper and polyethylene-coated paper. Examples of polymeric films include films comprising one or more polymers such as cellulose acetate butyrate; cellulose acetate propionate; cellulose triacetate; poly(meth) acrylates such as polymethyl methacrylate; polyesters such as polyethylene terephthalate, and polyethylene naphthalate; copolymers or blends based on naphthalene dicarboxylic acids; polyether sulfones; polyurethanes; polycarbonates; polyvinyl chloride; syndiotactic polystyrene; cyclic olefin copolymers; and polyolefins including polyethylene and polypropylene such as cast and biaxially oriented polypropylene. The substrate may comprise single or multiple layers, such as polyethylene-coated polyethylene terephthalate. The substrate may be primed or treated to impart some desired property to one or more of its surfaces. Examples of such treatments include corona, flame, plasma and chemical treatments.

The carrier web may also comprise a release liner. Any suitable release liner can be used. Exemplary release liners include those prepared from paper (e.g., Kraft paper) or polymeric material (e.g., polyolefins such as polyethylene or polypropylene, ethylene vinyl acetate, polyurethanes, polyesters such as polyethylene terephthalate, and the like). At least some release liners are coated with a layer of a release agent such as a silicone-containing material or a fluorocarbon-containing material. Exemplary release liners include, but are not limited to, liners commercially available from CP Film (Martinsville, Va.) under the trade designation "T-30" and "T-10" that have a silicone release coating on polyethylene terephthalate film. The liner can have a microstructure on its surface that is imparted to the adhesive to form a microstructure on the surface of the adhesive layer. The liner can then be removed to expose an adhesive layer having a microstructured surface.

Because the formed adhesive coatings and adhesives are optically clear, in many embodiments the substrate comprises an optical substrate or film. Examples of optical substrates include, for example glass sheets and other transparent substrate sheets such as polymethylmethacrylate or polycarbonate, as well as the surfaces of optical devices such as cathode ray tubes, display devices and the like. Optical films are particularly suitable substrates. As used herein, the term "optical film" refers to a film that can be used to produce an optical effect. The optical films are typically polymer-containing films that can be a single layer or multiple layers. The optical films are flexible and can be of any suitable thickness. The optical films often are at least partially transmissive, reflective, antireflective, polarizing, optically clear, or diffusive with respect to some wavelengths of the electromagnetic spectrum (e.g., wavelengths in the visible ultraviolet, or infrared regions of the electromagnetic spectrum). Exemplary optical films include, but are not limited to, visible mirror films, color mirror films, solar reflective films, infrared reflective films, ultraviolet reflective films, reflective polarizer films such as a brightness enhancement films and dual brightness enhancement films, absorptive polarizer films, optically clear films, tinted films, and antireflective films.

In some embodiments the optical film has a coating. In general, coatings are used to enhance the function of the film or provide additional functionality to the film. Examples of coatings include, for example, hardcoats, anti-fog coatings, anti-scratch coatings, privacy coatings or a combination thereof. Coatings such as hardcoats, anti-fog coatings, and anti-scratch coatings that provide enhanced durability, are desirable in applications such as, for example, touch screen sensors, display screens, graphics applications and the like. Examples of privacy coatings include, for example, blurry or hazy coatings to give obscured viewing or louvered films to limit the viewing angle.

Some optical films have multiple layers such as multiple layers of polymer-containing materials (e.g., polymers with or without dyes) or multiple layers of metal-containing material and polymeric materials. Some optical films have alternating layers of polymeric material with different indexes of refraction. Other optical films have alternating polymeric layers and metal-containing layers. Exemplary optical films are described in the following patents: U.S. Pat. No. 6,049,419 (Wheatley et al.); U.S. Pat. No. 5,223,465 (Wheatley et al.); U.S. Pat. No. 5,882,774 (Jonza et al.); U.S. Pat. No. 6,049,419 (Wheatley et al.); U.S. Pat. No. RE 34,605 (Schrenk et al.); U.S. Pat. No. 5,579,162 (Bjornard et al.), and U.S. Pat. No. 5,360,659 (Arends et al.).

The curable mixture coated onto a substrate is partially polymerized. This partial polymerization is effected by activating the initiator present in the curable mixture. While this activation may be done thermally, typically photoinitiators are used and initiation is effected by exposure to actinic radiation. As described above, more than one photoinitiator may be used in the curable mixture, and if two photoinitiators are used they may have different sensitivities to actinic radiation. For example, the two photoinitiators may be sensitive to different wavelengths of light or they may activate upon exposure to different doses of radiation. In some embodiments, it is desirable to have partial polymerization initiated at radiation doses of less than 2000 milliJoules per square centimeter ($mJ/cm^2$). Radiation dose can be controlled in a variety of different ways: by controlling the intensity of light that the curable mixture is exposed to by choice of lamps, power of lamps, etc; by controlling the distance of the curable mixture from the light source; by controlling exposure time of the curable mixture to the radiation (for example, by controlling the line speed of coating line); and the like.

In some embodiments, the partial polymerization apparatus uses recently developed ultraviolet light emitting diode (UV LED) systems. An advantage of UV LED systems include the compact size of the units, which can readily be positioned close to a coating station. Another advantage of UV LED systems is that they can also radiate very little infrared radiation, which results in reduced heating of the coating and decreased solvent evaporation. These characteristics can enhance the safe operation of the polymerization apparatus, and make it practical to expose UV-curable compositions in an environment where a coating solvent is present. UV LED systems can be configured to operate at several desired peak wavelengths, such as 365 nm, 385 nm, 395 nm, 405 nm, and the like. Other radiation sources may be used, such as, for example, UV lasers, UV lamps, germicidal UV bulbs, visible lamps, flashlamps, and the like; and other high-energy particle devices, including, for example, electron-beam (EB) sources and the like. In some embodiments, UV LED systems can provide advantages over the other radiation sources.

While not wishing to be bound by theory, it is believed that partial polymerization aids in the formation of an optically clear final coating or adhesive. It has been observed that coating, drying and curing of relatively incompatible monomer compositions typically produces coating or adhesive layers that are not optically clear.

After partial curing of the curable mixture coated on a substrate, the coated layer is dried to remove the transient compatibilizer and any other volatile components. This drying is typically done by exposing the coated layer to an elevated temperature in, for example, a forced air oven.

After the coated layer is dried, the partially cured curable mixture is fully cured, i.e. fully polymerized, to form the optically clear coating or adhesive. Typically, the polymerization is initiated by activating the initiator present in the curable composition, either thermally or photochemically. As with the partial curing step describe above, typically activation is effected photochemically. Fully curing the curable mixture is typically achieved by using a higher radiation dose than the partial curing described above. As with the relatively low radiation dose used to achieve partial polymerization, a variety of techniques can be used to achieve the higher radiation dose suitable to effect full curing. Radiation dose can be controlled in a variety of different ways: by controlling the intensity of light that the curable mixture is exposed to by choice of lamps, power of lamps, etc; by controlling the distance of the curable mixture from the light source; by controlling exposure time of the curable mixture to the radiation (for example, by controlling the line speed of coating line); and the like. The full curing may be carried out using a UV LED system or one of the other actinic radiation sources described above. Additionally, as mentioned above, more than one photoinitiator may be present in the curable mixture. One photoinitiator may be sensitive to the radiation of the partial curing conditions and the other photoinitiator may be sensitive to the radiation of the full curing conditions. In some embodiments, a combination of initiators, such as two different photoinitiators, are used. For example, one photoinitiator may preferentially absorb light of a relatively longer wavelength (for example 360-405 nanometers) and a second photoinitiator may preferentially absorb light of relatively shorter wavelengths, (for example 280-340 nanometers). The longer wavelength absorbing photoinitiator is suitable for use with the less intense partial curing of the curable reaction mixture and the shorter wavelength absorbing photoinitiator is suitable for the more intense full curing of the curable reaction mixture. Examples of longer wavelength absorbing photoinitiators suitable for partial curing, include the commercially available photoinitiators IRGACURE 819 and IRGACURE 784 from Ciba Specialty Chemicals, Hawthorne, N.Y. Examples of shorter wavelength absorbing photoinitiators include the commercially available photoinitiators DAROCUR 1173 and IRGACURE 651 from Ciba Specialty Chemicals, Hawthorne, N.Y.

In other embodiments of the methods of this disclosure, the curable mixture is partially cured, coated onto a substrate, dried to remove the transient compatibilizer, and fully cured. Each of these steps is carried out as described above.

In embodiments of this method, the curable mixture is partially cured prior to coating onto a substrate. As described above, this partial curing may be carried out thermally or photochemically depending upon the initiator or initiators present in the curable mixture. After partial curing of the curable mixture, the mixture is coated onto a substrate, dried, and fully cured as described above.

The methods of this disclosure provide a variety of articles. Because the coating and adhesive layers of this disclosure are optically clear and have desirable optical properties, such as high visible light transmission (at least 90% transmission) and low haze (less than 5%), they can be used in a wide variety of optical applications. For example, if the substrate on which the optically clear adhesive or coating layer of this disclosure is formed is an optical substrate or film, the articles may be optical elements or can be used to prepare optical elements. As used herein, the term "optical element" refers to an article that has an optical effect or optical application. The optical elements can be used, for example, in electronic displays, architectural applications, transportation applications, projection applications, photonics applications, and graphics applications. Suitable optical elements include, but are not limited to, screens or displays, cathode ray tubes, polarizers, reflectors, and the like.

Optical coating layers of this disclosure may be used, for example, as an optically clear protective layer. Optical adhesives of this disclosure can be used, for example to adhere an optical film to an optical substrate, to adhere together two optical substrates, or to adhere together two optical films.

The present disclosure includes the following embodiments.

Among the embodiments are methods of preparing optical adhesive or coating layers. A first embodiment includes a method of preparing an optical adhesive or coating layer comprising: preparing a curable mixture, the curable mixture comprising: a first free radically polymerizable monomer composition; a second free radically polymerizable monomer composition; at least one free radical initiator; and a transient compatibilizer, wherein the first monomer composition and the second monomer composition are selected such that blends of polymers formed from the first monomer composition and the second monomer composition form phase separated domains; coating the curable mixture to form a layer; partially curing the curable mixture; drying the coated layer; and fully curing the curable mixture.

Embodiment 2 is the method of embodiment 1, wherein the first monomer composition comprises at least one (meth)acrylate monomer.

Embodiment 3 is the method of embodiment 1 or 2, wherein the second monomer composition comprises at least one (meth)acrylate macromer with a molecular weight higher that is higher than the at least one (meth)acrylate monomer of the first monomer composition.

Embodiment 4 is the method of any of embodiments 1-3, wherein the second monomer composition comprises at least one (meth)acrylate macromer selected from the group comprising urea-based (meth)acrylates, urethane-based (meth)acrylates, siloxane-based (meth)acrylates, fluorinated (meth)acrylates, and mixtures thereof.

Embodiment 5 is the method of any of embodiments 1-4, wherein the curable mixture further comprises at least one multifunctional (meth)acrylate.

Embodiment 6 is the method of any of embodiments 1-5, wherein the layer has an visible light transmission of at least 90% and a haze value of less than 5%.

Embodiment 7 is the method of any of embodiments 1-6, wherein the transient compatibilizer comprises at least one solvent capable of solvating the first monomer composition and the second monomer composition.

Embodiment 8 is the method of embodiment 7, wherein the at least one solvent comprises an alcohol, an aliphatic hydrocarbon, an aromatic solvent, an ether, an ester, a ketone, or combination thereof.

Embodiment 9 is the method of any of embodiments 1-8, wherein partially curing the curable mixture comprises selective curing of the curable mixture.

Embodiment 10 is the method of embodiment 9, comprising using a photomask to selectively cure the curable mixture.

Embodiment 11 is the method of any of embodiments 1-10, wherein partially curing the curable mixture comprises curing with a radiation dose of below 2000 mJoules/cm$^2$.

Embodiment 12 is the method of any of embodiments 1-11, wherein the at least one initiator comprises at least one photoinitiator.

Embodiment 13 is the method of any of embodiments 1-12, wherein the curable mixture comprises less than 50% solids.

Embodiment 14 is the method of any of embodiments 1-13, wherein the curable mixture comprises less than 40% solids.

Embodiment 15 is the method of any of embodiments 1-14, wherein the curable mixture comprises less than 35% solids.

Embodiment 16 is the method of any of embodiments 1-15, wherein the curable mixture comprises less than 30% solids.

Embodiment 17 is the method of any of embodiments 1-16, wherein the curable mixture comprises less than 25% solids.

Embodiment 18 is the method of any of embodiments 1-17, wherein the curable mixture comprises less than 20% solids.

Embodiment 19 is the method of any of embodiments 1-18, wherein the curable mixture comprises less than 15% solids.

Embodiment 20 is the method of any of embodiments 1-19, further comprising a second initiator.

Embodiment 21 is the method of embodiment 20, wherein the second initiator comprises a photoinitiator.

Embodiment 22 includes a method of preparing an optical adhesive or coating layer comprising: preparing a curable mixture, the curable mixture comprising: a first free radically polymerizable monomer composition; a second free radically polymerizable monomer composition; at least one free radical initiator; and a transient compatibilizer, wherein the first monomer composition and the second monomer composition are selected such that blends of polymers formed from the first monomer composition and the second monomer composition form phase separated domains; partially curing the curable mixture; coating the curable mixture to form a layer; drying the coated layer; and fully curing the curable mixture.

Embodiment 23 is the method of embodiment 22, wherein the first monomer composition comprises at least one (meth)acrylate monomer.

Embodiment 24 is the method of embodiment 22 or 23, wherein the second monomer composition comprises at least one (meth)acrylate macromer with a molecular weight higher that is higher than the at least one (meth)acrylate monomer of the first monomer composition.

Embodiment 25 is the method of any of embodiments 22-24, wherein the second monomer composition comprises at least one (meth)acrylate macromer selected from the group comprising urea-based (meth)acrylates, urethane-based (meth)acrylates, siloxane-based (meth)acrylates, fluorinated (meth)acrylates, and mixtures thereof.

Embodiment 26 is the method of any of embodiments 22-25, wherein the curable mixture further comprises at least one multifunctional (meth)acrylate.

Embodiment 27 is the method of any of embodiments 22-26, wherein the layer has an visible light transmission of at least 90% and a haze value of less than 5%.

Embodiment 28 is the method of any of embodiments 22-27, wherein the transient compatibilizer comprises at least one solvent capable of solvating the first monomer composition and the second monomer composition.

Embodiment 29 is the method of embodiment 28, wherein the at least one solvent comprises an alcohol, an aliphatic hydrocarbon, an aromatic solvent, an ether, an ester, a ketone, or combination thereof.

Embodiment 30 is the method of any of embodiments 22-29, wherein partially curing the curable mixture comprises selective curing of the curable mixture.

Embodiment 31 is the method of any of embodiments 22-30, wherein partially curing the curable mixture comprises curing with a radiation dose of below 2000 mJoules/$cm^2$.

Embodiment 32 is the method of any of embodiments 22-31, wherein the at least one initiator comprises at least one photoinitiator.

Embodiment 33 is the method of any of embodiments 22-32, wherein the curable mixture comprises less than 50% solids.

Embodiment 34 is the method of any of embodiments 22-33, wherein the curable mixture comprises less than 40% solids.

Embodiment 35 is the method of any of embodiments 22-34, wherein the curable mixture comprises less than 35% solids.

Embodiment 36 is the method of any of embodiments 22-35, wherein the curable mixture comprises less than 30% solids.

Embodiment 37 is the method of any of embodiments 22-36, wherein the curable mixture comprises less than 25% solids.

Embodiment 38 is the method of any of embodiments 22-37, wherein the curable mixture comprises less than 20% solids.

Embodiment 39 is the method of any of embodiments 22-38, wherein the curable mixture comprises less than 15% solids.

Embodiment 40 is the method of any of embodiments 22-39, further comprising a second initiator.

Embodiment 41 is the method of embodiment 40, wherein the second initiator comprises a photoinitiator.

Among the embodiments are optical articles. Embodiment 42 includes an optical article comprising: an optical substrate; and a layer of optically clear adhesive coated on the optical substrate, the optically clear adhesive comprising a cured reaction mixture comprising: a first free radically polymerizable monomer composition; a second free radically polymerizable monomer composition; at least one free radical initiator; and a transient compatibilizer, wherein the cured reaction mixture has a domain size smaller than the wavelength of visible light and wherein the first monomer composition and the second monomer composition are selected such that blends of polymers formed from the first monomer composition and the second monomer composition form phase separated domains.

Embodiment 43 is the article of embodiment 42, wherein the first monomer composition comprises at least one (meth)acrylate monomer.

Embodiment 44 is the article of embodiment 42 or 43, wherein the second monomer composition comprises at least one (meth)acrylate macromer with a molecular weight higher that is higher than the at least one (meth)acrylate monomer of the first monomer composition.

Embodiment 45 is the article of any of embodiments 42-44, wherein the second monomer composition comprises at least one (meth)acrylate macromer selected from the group comprising urea-based (meth)acrylates, urethane-based (meth)acrylates, siloxane-based (meth)acrylates, fluorinated (meth)acrylates, and mixtures thereof.

Embodiment 46 is the article of any of embodiments 42-45, wherein the curable mixture further comprises at least one multifunctional (meth)acrylate.

Embodiment 47 is the article of any of embodiments 42-46, wherein the layer has an visible light transmission of at least 90% and a haze value of less than 5%.

Embodiment 48 is the article of any of embodiments 42-47, wherein the transient compatibilizer comprises at least one solvent capable of solvating the first monomer composition and the second monomer composition.

Embodiment 49 is the article of embodiment 48, wherein the at least one solvent comprises an alcohol, an aliphatic hydrocarbon, an aromatic solvent, an ether, an ester, a ketone, or combination thereof.

Embodiment 50 is the article of any of embodiments 42-49, wherein partially curing the curable mixture comprises selective curing of the curable mixture.

Embodiment 51 is the article of any of embodiments 42-50, wherein partially curing the curable mixture comprises curing with a radiation dose of below 2000 mJoules/$cm^2$.

Embodiment 52 is the article of any of embodiments 42-51, wherein the at least one initiator comprises at least one photoinitiator.

Embodiment 53 is the article of any of embodiments 42-52, wherein the curable mixture comprises less than 50% solids.

Embodiment 54 is the article of any of embodiments 42-53, wherein the curable mixture comprises less than 40% solids.

Embodiment 55 is the article of any of embodiments 42-54, wherein the curable mixture comprises less than 35% solids.

Embodiment 56 is the article of any of embodiments 42-55, wherein the curable mixture comprises less than 30% solids.

Embodiment 57 is the article of any of embodiments 42-56, wherein the curable mixture comprises less than 25% solids.

Embodiment 58 is the article of any of embodiments 42-57, wherein the curable mixture comprises less than 20% solids.

Embodiment 59 is the article of any of embodiments 42-58, wherein the curable mixture comprises less than 15% solids.

Embodiment 60 is the article of any of embodiments 42-59, further comprising a second initiator.

Embodiment 61 is the article of embodiment 60, wherein the second initiator comprises a photoinitiator.

Embodiment 62 is the article of any of embodiments 42-61, wherein the optical substrate comprises a rigid substrate or a flexible film.

Embodiment 63 is the article of embodiment 62, wherein the rigid substrate comprises a glass sheet, a polymethylmethacrylate sheet, a polycarbonate sheet, or the surface of an optical device.

Embodiment 64 is the article of embodiment 63, wherein the optical device comprises a cathode ray tube or a display device.

Embodiment 65 is the article of embodiments 62, wherein the flexible film comprises an optical film.

Embodiment 66 is the article of embodiments 65, wherein the optical film comprises a visible mirror film, a color mirror film, a solar reflective film, an infrared reflective film, an ultraviolet reflective film, a reflective polarizer film, a brightness enhancement film, a dual brightness enhancement film, an absorptive polarizer film, an optically clear film, a tinted film, an antireflective film, or combinations thereof.

Embodiment 67 is the article of any of embodiments 42-66, wherein the optical substrate further comprises at least one coating on at least a portion of at least one surface of the substrate.

Embodiment 68 is the article of embodiment 67, wherein the coating comprises a hardcoat, an anti-fog coating, an anti-scratch coating, a privacy coating or a combination thereof.

EXAMPLES

These examples are merely for illustrative purposes only and are not meant to be limiting on the scope of the appended claims. All parts, percentages, ratios, etc. in the examples and the rest of the specification are by weight, unless noted otherwise. Solvents and other reagents used were obtained from Sigma-Aldrich Chemical Company; Milwaukee, Wis. unless otherwise noted.

Table of Abbreviations

| Abbreviation or Trade Designation | Description |
|---|---|
| MAcEPE | 8k MW MethAcrylated Extended Polyether as described in PCT Publication WO 2009/085662. |
| PSA-1 | Pressure sensitive adhesive solution, IOA/MA/AA, 26% solids by weight in ethyl acetate, of a copolymer PSA with an approximate ratio of monomers of 58/35/7 isoctyl acrylate/methacrylate/acrylic acid prepared as described in U.S. Pat. No. RE 24,906 (Ulrich). |
| DPP | Dipentaerythritol Pentacrylate, commercially available from Sartomer Company, Exton, PA as "SR 399". |
| TPGD | Tripropylene glycol diacrylate, commercially available from Sartomer Company, Exton, PA as "SR 306F". |
| IPM | Isopropyl myristate plasticizer, Liponate IPM from Lipo Chemical, Inc. Paterson, New Jersey. |
| AS-1 | Acrylated silicone polyether copolymer commercially available from Momentive Perfomance Materials, Columbus, Ohio as "COAT-O-SIL 3503" |
| UA-1 | Low Tg urethane acrylate commercially available from Sartomer Company, Exton, PA as "CN 9018". |
| Photoinitiator-1 | Photoinitiator commercially available from Ciba, Hawthorne, NY as "DAROCUR 4265". |
| PET-1 | Polyethylene terephthalate film substrate available under trade name "MELINEX 618" from Dupont Teijin Films, Hopewell, VA having a thickness of 127 microns (5 mils) |
| PET-2 | Polyethylene terephthalate film substrate available under trade name "MELINEX 454" from Dupont Teijin Films, Hopewell, VA having a thickness of 51 microns (2 mils) |
| Liner | Polyethylene terphthalate liner film available under trade name "HOSTOPHAN 2261N" from Mitsubishi Polyester Film, Greer, NC having a thickness of 23 microns (0.92 mils) |

Formulation Table

| Formulation | Components (initial % by total solids) |
|---|---|
| F1 | MAcEPE/DPP/TPGD/IPM/PSA-1 (30/10/10/25/25) + 2% Photoinitiator-1 |
| F2 | MAcEPE/DPP/TPGD/IPM/PSA-1 (22/35/7/18/18) + 2% Photoinitiator-1 |
| F3 | UA-1/AS-1 (50/50) + 2% Photoinitiator-1 |

Formulation Preparation F1 and F2

All components were added to each mixture in the solids weight percentages specified. Each mixture was diluted to 35% solids using ethyl acetate, isopropanol, and methoxy propanol (40/50/10). Also added to each mixture was 2% by solids weight Photoinitiator-1.

Formulation Preparation F3

All components were added to the mixture in the solids weight percentages specified. The mixture was diluted to 30% solids using ethyl acetate, isopropanol, and methoxy propanol (40/50/10). Also added to the mixture was 2% by solids weight Photoinitiator-1.

Sample Preparation Table

| Sample | Formulation | Process |
|---|---|---|
| C1 | F1 | Coat, Dry, Cure, Laminate |
| E1 | F1 | Coat, Partial Cure, Dry, Cure, Laminate |
| C2 | F2 | Coat, Dry, Cure, Laminate |
| E2 | F2 | Coat, Partial Cure, Dry, Cure, Laminate |
| C3 | F3 | Coat, Dry, Cure, Laminate |
| E3 | F3 | Coat, Partial Cure, Dry, Cure, Laminate |

Samples C1 and C2 were coated onto PET-1 using a slot coater. The wet coating thickness was approximately 76 micrometers (3 mils). Samples C1 and C2 were dried at 70° C. in a 9 meter oven, then cured under a 236 Watts/cm Fusion H bulb (commercially available from Fusion UV System, Gaithersburg, Md.) with a nitrogen purged atmosphere. The Liner film was laminated over the adhesive after the final cure and the resulting laminate was wound into a roll. All these processes were run in-line at 3 meters/minute. % Haze and % Transmission tests were carried out using the test method described below.

Samples E1 and E2 were prepared using the same conditions as C1 and C2 with the addition of a partial cure step after the coating step and prior to the drying step. The partial cure process was carried out in-line at the same line speed (3 meters/minute) and with a UV (395 nm) dose of 850 mJoules/cm$^2$ (UV-LEDs commercially available from Cree, Inc., Durham N.C.). This was performed in an inerted chamber (<200 ppm $O_2$).

Sample C3 was coated onto PET-2 using a slot coater. The wet coating thickness was approximately 167.6 micrometers (6.6 mils). The sample was dried at 70° C. in a 9 meter oven, and then cured under a 236 Watts/cm Fusion H bulb (commercially available from Fusion UV System, Gaithersburg, Md.) with a nitrogen purged atmosphere. The Liner film was laminated over the adhesive after the final cure and the resulting laminate was wound into a roll. All these processes were run in-line at 3 meters/minute. % Haze and % Transmission tests were carried out using the test method described below.

Sample E3 was prepared using the same conditions as C3 with the addition of a partial cure step after the coating step and prior to the drying step. The partial cure process was carried out in-line at the same line speed (3 meters/minute) and with a UV (395 nm) dose of 850 mJoules/cm$^2$ (UV-LEDs commercially available from Cree, Inc., Durham N.C.). This was performed in an inerted chamber (<200 ppm $O_2$).

Test Methods
% Haze and % Transmission

Measurements were made using a HAZE-GARD PLUS available from BYK-Gardner USA, Columbia, Md. The Liner film was removed from the sample just prior to measurement. The film side of the sample was placed on the measurement port of the HAZE-GARD PLUS (adhesive side was exposed to air). The % haze and % transmission values were recorded.

Results

% Haze and % Transmission results of the various samples are shown in Table 1.

TABLE 1

| Sample | % Haze | % Transmission | Partial Cure |
|---|---|---|---|
| C1 | 0.6 | 94.0 | Off |
| E1 | 0.5 | 94.0 | On |
| C2 | 36.9 | 92.9 | Off |
| E2 | 1.9 | 93.3 | On |
| C3 | 6.5 | 92.7 | Off |
| E3 | 0.3 | 93.0 | On |

What is claimed is:

1. A method of preparing an optical adhesive or coating layer comprising:
   preparing a curable mixture, the curable mixture comprising:
   a first free radically polymerizable monomer composition;
   a second free radically polymerizable oligomer composition;
   at least one free radical initiator;
   and a transient compatibilizer, wherein the first monomer composition and the second oligomer composition are selected such that blends of homopolymers formed from the first monomer composition and the second oligomer composition form phase separated domains;
   coating the curable mixture to form a layer;
   partially curing the curable mixture in the layer to form a partially cured layer;
   drying the partially cured layer; and
   fully curing the partially cured and dried curab, mixture, wherein the fully cured and dried layer has a domain size smaller than the wavelength of visible light. a visible light transmission of at least 90%, and a haze value of less than 5%.

2. The method of claim 1, wherein the first monomer composition comprises at least one (meth)acrylate monomer.

3. The method of claim 1, wherein the second free radically polymerizable oligomer composition comprises at least one (meth)acrylate macromer selected from the group comprising urea-based (meth)acrylates, urethane-based (meth)acrylates, siloxane-based (meth)acrylates, fluorinated (meth)acrylates, and mixtures thereof.

4. The method of claim 1, wherein the curable mixture further comprises at least one multifunctional (meth)acrylate.

5. The method of claim 1, wherein the transient compatibilizer comprises at least one solvent capable of solvating the first monomer composition and the second oligomer composition.

6. The method of claim 1, wherein partially curing the curable mixture comprises selective curing of the curable mixture.

7. The method of claim 6, comprising using a photomask to selectively cure the curable mixture.

8. The method of claim 1, wherein partially curing the curable mixture comprises curing with a radiation dose of below 2000 mJoules/cm$^2$.

9. The method of claim 1, wherein the at least one initiator comprises at least one photoinitiator.

10. The method of claim 1, wherein the curable mixture comprises less than 50% solids by weight.

* * * * *

UNITED STATES PATENT AND TRADEMARK OFFICE
CERTIFICATE OF CORRECTION

PATENT NO. : 9,841,534 B2
APPLICATION NO. : 13/991436
DATED : December 12, 2017
INVENTOR(S) : Tapio et al.

It is certified that error appears in the above-identified patent and that said Letters Patent is hereby corrected as shown below:

In the Specification

Column 3
Line 19 (approx.), delete "compatiblizer." and insert -- compatibilizer. --, therefor.

Line 30 (approx.), delete "compatiblizer." and insert -- compatibilizer. --, therefor.

Column 5
Line 51-52 (approx.), delete "poloxyyalkylenes" and insert -- polyoxyalkylenes --, therefor.

Column 6
Line 66, delete "(meth)acryalte" and insert -- (meth)acrylate --, therefor.

Column 7
Line 52, delete "acryalte" and insert -- acrylate --, therefor.

Column 8
Line 2, delete "pentaerithritol" and insert -- pentaerythritol --, therefor.

Line 2, delete "dipentaerithritol" and insert -- dipentaerythritol --, therefor.

Column 9
Line 60-61, delete "2-methyl-1,5diisocyanatopentane," and insert -- 2-methyl-1,5-diisocyanatopentane, --, therefor.

Column 9
Line 67, delete "avarerge" and insert -- average --, therefor.

Signed and Sealed this
Sixteenth Day of April, 2019

Andrei Iancu
*Director of the United States Patent and Trademark Office*

Column 11
Line 48, delete "ethylnenically" and insert -- ethylenically --, therefor.

Line 62, delete "—$(C_pJ_{2p}CJ(Z)O)$—," and insert -- —$(C_pJ_{2p}CJ(Z')O)$—, --, therefor.

Column 12
Line 18, delete "$CF_3O(C_2F_4O)_nCF_2$—," and insert -- $CF_3O(C_2F_4O)_aCF_2$—, --, therefor.

Line 23, delete "endgroup" and insert -- end group --, therefor.

Line 50, delete "—$(CF_2CF(CF_3)O)_1$—" and insert -- —$(CF_2CF(CF_3)O)_1$— --, therefor.

Line 52, delete "—$(CF_2CF_2O)_1$—" and insert -- —$(CF_2CF_2O)_1$— --, therefor.

Column 13
Line 8 (approx.), delete "l" and insert -- 1 --, therefor.

Column 14
Line 14-16, delete "para-acryloxyethoxybenophenone, and para-N-(methacryloxyethyl)-carbamoylethoxybenophenone." and insert -- para-acryloxyethoxybenzophenone, and para-N-(methacryloxyethyl)-carbamoylethoxybenzophenone. --, therefor.

Column 23-24
Line 12 (approx.), delete "isoctyl" and insert -- isooctyl --, therefor.

Line 14 (approx.), delete "Pentacrylate," and insert -- Pentaacrylate, --, therefor.

Line 21 (approx.), delete "Perfomance" and insert -- Performance --, therefor.

Line 33 (approx.), delete "terphthalate" and insert -- terephthalate --, therefor.

Line 34 (approx.), delete ""HOSTOPHAN" and insert -- "HOSTAPHAN --, therefor.

In the Claims

Column 26
Line 26 (approx.), in Claim 1, delete "curab," and insert -- curable --, therefor.

Line 28 (approx.), in Claim 1, delete "light." and insert -- light, --, therefor.